(12) United States Patent
Uchiyama et al.

(10) Patent No.: US 9,958,920 B2
(45) Date of Patent: May 1, 2018

(54) ELECTRONIC DEVICE AND METHOD

(71) Applicant: Kabushiki Kaisha Toshiba, Minato-ku, Tokyo (JP)

(72) Inventors: Isamu Uchiyama, Ome Tokyo (JP); Ryuhei Yokota, Tachikawa Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 212 days.

(21) Appl. No.: 14/741,810

(22) Filed: Jun. 17, 2015

(65) Prior Publication Data
US 2016/0043595 A1 Feb. 11, 2016

(30) Foreign Application Priority Data

Aug. 7, 2014 (JP) .................. 2014-161165

(51) Int. Cl.
*H02J 7/00* (2006.01)
*G06F 1/26* (2006.01)

(52) U.S. Cl.
CPC ............ *G06F 1/266* (2013.01); *H02J 7/0052* (2013.01); *H02J 7/0054* (2013.01); *H02J 2007/0062* (2013.01)

(58) Field of Classification Search
CPC ....................................................... H02J 9/061
See application file for complete search history.

(56) References Cited

U.S. PATENT DOCUMENTS

2015/0198932 A1*  7/2015  Cha ....................... H02M 3/156
                                                              700/295

FOREIGN PATENT DOCUMENTS

| JP | 2002-163044 A | 6/2002 |
| JP | 2006-277346 A | 10/2006 |
| JP | 2012-244847 A | 12/2012 |

\* cited by examiner

*Primary Examiner* — Jeffrey Shin
(74) *Attorney, Agent, or Firm* — Knobbe, Martens, Olson & Bear, LLP

(57) ABSTRACT

According to one embodiment, an electronic device includes a power supply, a port and a circuit. The port is configured to connect with an external device. The circuit is configured to control the power supply to supply a first voltage to the external device connected with the port if a system status of the electronic device is not a power-saving status, and to supply a second voltage different from the first voltage to the external device if the system status of the electronic device is the power-saving status.

10 Claims, 5 Drawing Sheets

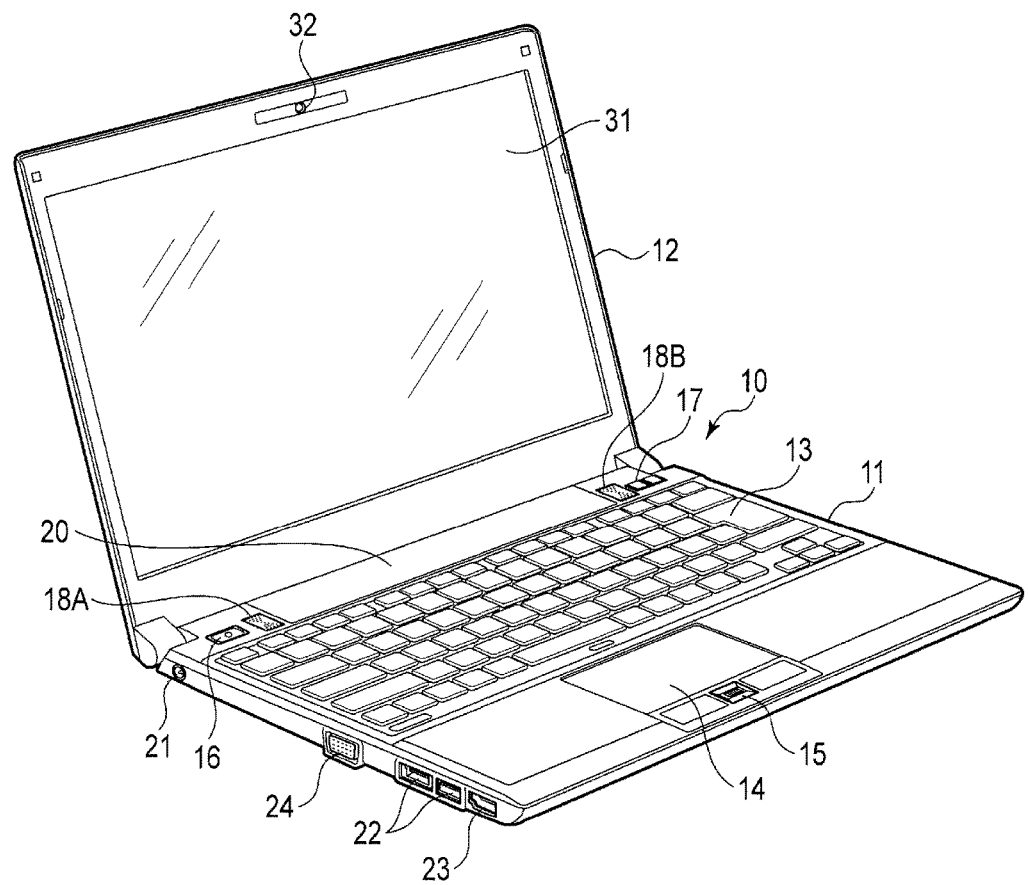
F I G. 1

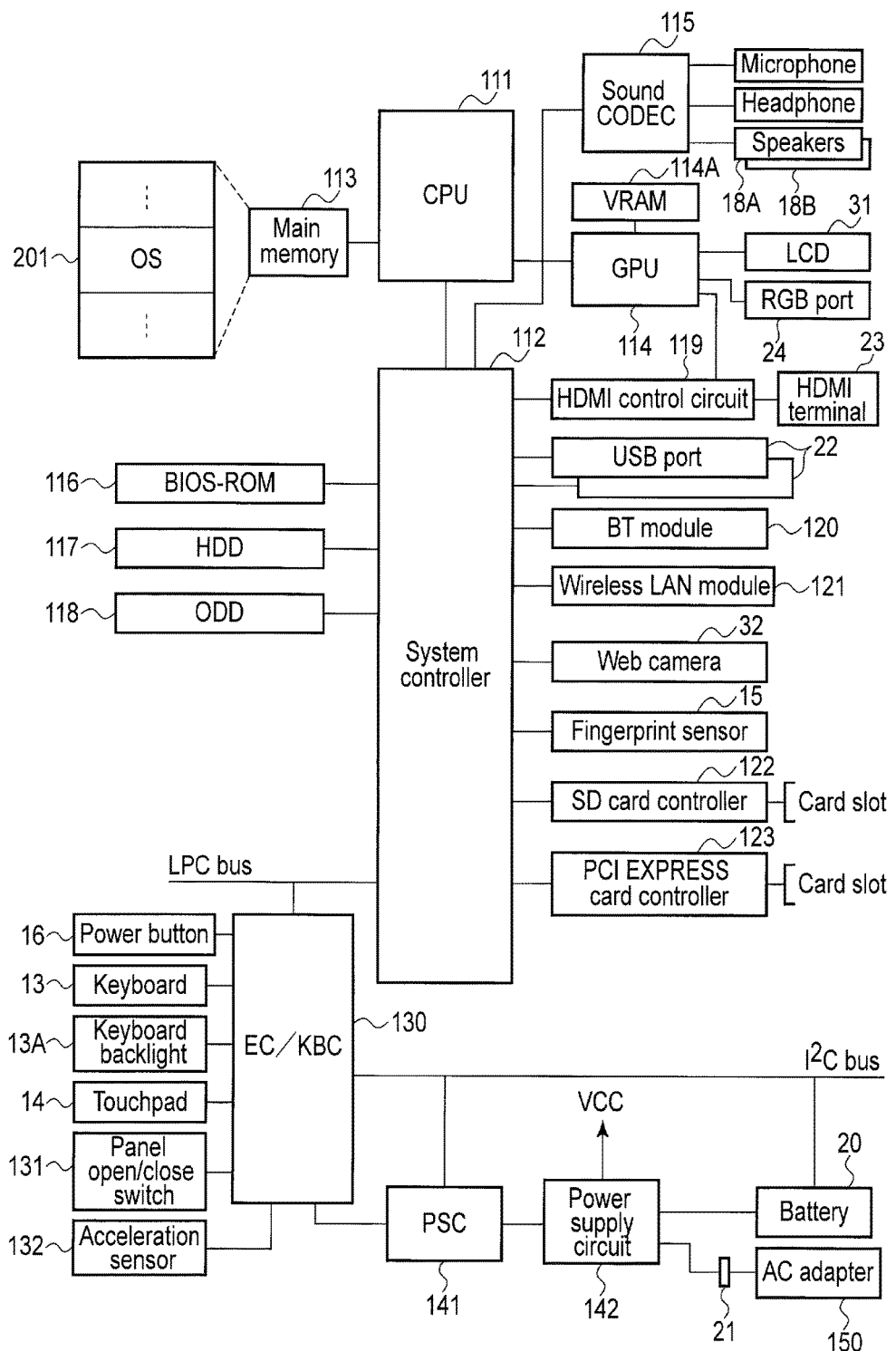
F I G. 2

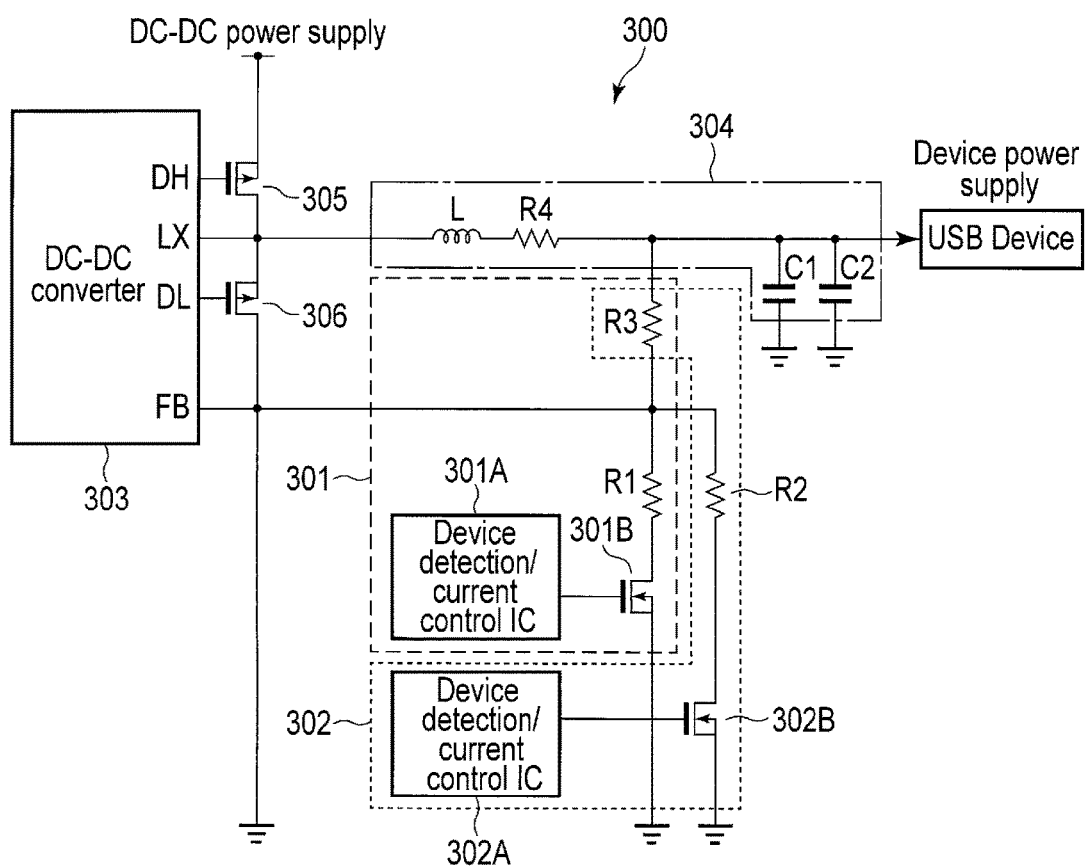
F I G. 3

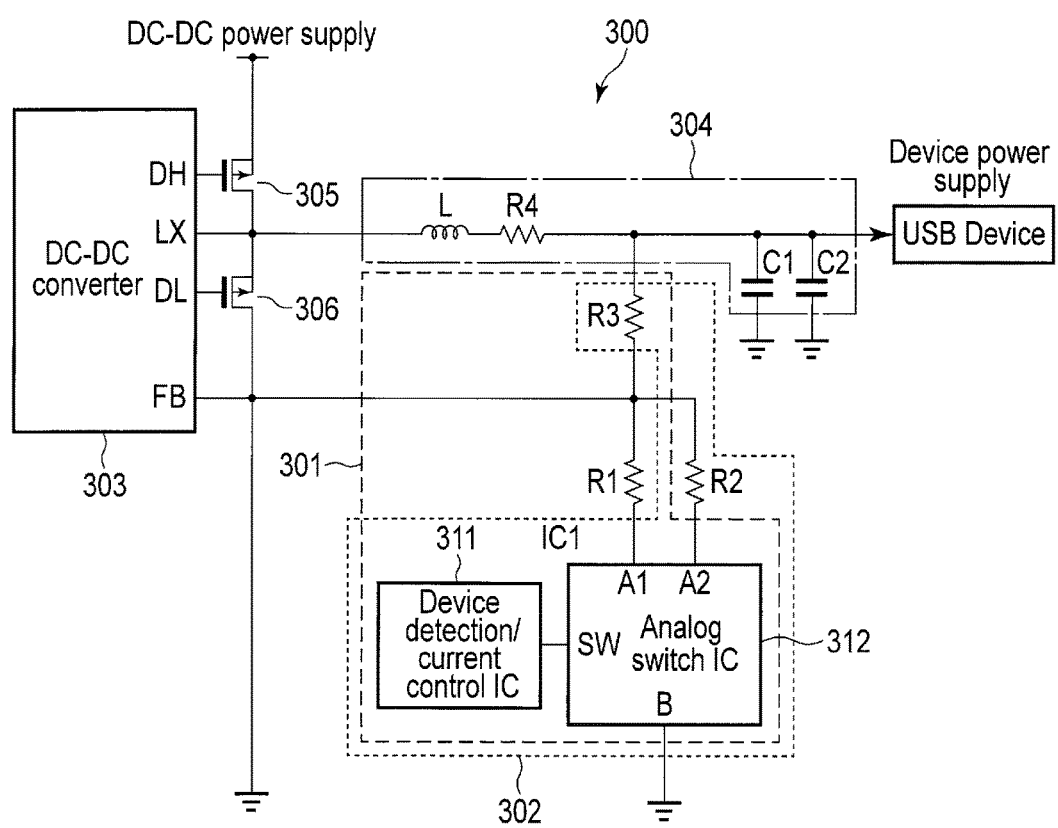
F I G. 5

ELECTRONIC DEVICE AND METHOD

CROSS-REFERENCE TO RELATED APPLICATIONS

This application is based upon and claims the benefit of priority from Japanese Patent Application No. 2014-161165, filed Aug. 7, 2014, the entire contents of which are incorporated herein by reference.

FIELD

Embodiments described herein relate generally to an electronic device and a method.

BACKGROUND

Recently, capacity of a battery built in a portable electronic device such as a tablet, smartphone, etc., has been increased. Because of this, the portable electronic device can continuously work for a long time while the time to fully charge the battery is long. To solve this inconvenience, application of not only a standard charging system in this technical industry, but also an own charging system of a manufacturer manufacturing the portable electronic devices (for example, a charging system using a larger voltage than the standard charging system of this technical industry) is increased.

The time to fully charge the battery can be reduced by applying the manufacturer's own charging system, as mentioned above. By applying the manufacturer's own charging system, however, another inconvenience arises that charging cannot be executed in the standard charging system in this technical industry or the charging time becomes very long in the standard charging system in this technical industry.

Thus, implement of new technology of solving another inconvenience is required.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is a perspective view showing an appearance of an electronic device of one of the embodiments.

FIG. 2 is a block diagram showing a system configuration of the electronic device of the embodiment.

FIG. 3 is a circuit diagram showing an example of a circuit configuration in a DC output switching circuit incorporated in the electronic device of the embodiment.

FIG. 5 is a circuit diagram showing an example of another circuit configuration in the DC output switching circuit incorporated in the electronic device of the embodiment.

DETAILED DESCRIPTION

Figure 4:
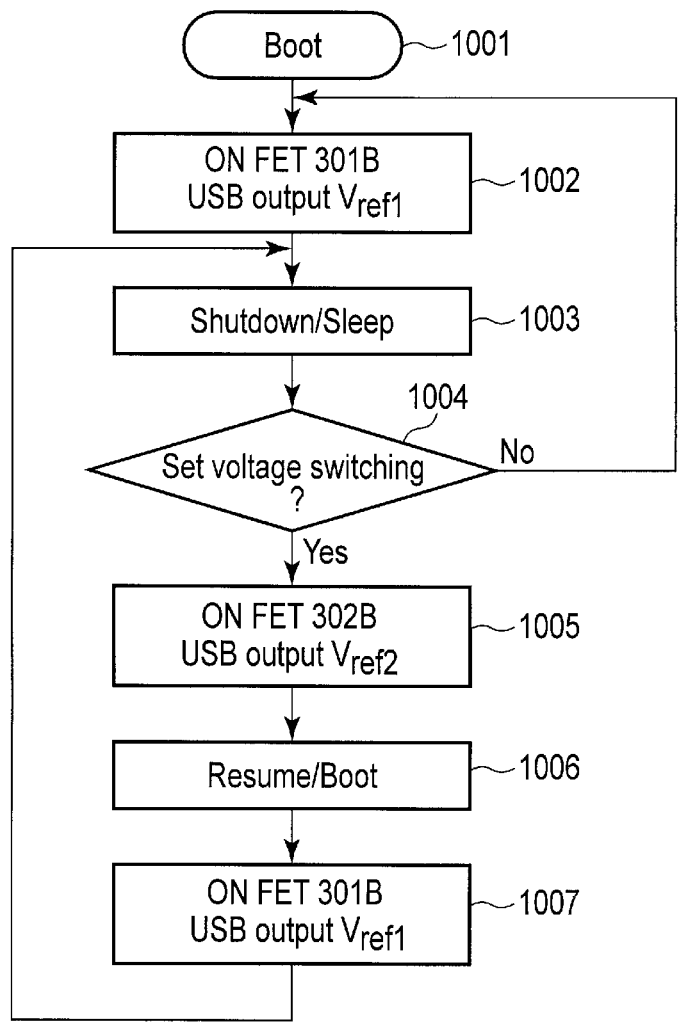
FIG. 4 is a flowchart showing an example of operations of a circuit configuration in the DC output switching circuit incorporated in the electronic device of the embodiment.

Various embodiments will be described hereinafter with reference to the accompanying drawings.

In general, according to one embodiment, an electronic device includes a power supply, a port and a circuit. The port is configured to connect with an external device. The circuit is configured to control the power supply to supply a first voltage to the external device connected with the port if a system status of the electronic device is not a power-saving status, and to supply a second voltage different from the first voltage to the external device if the system status of the electronic device is the power-saving status.

First, a configuration of an electronic device of one of the embodiments will be explained with reference to FIG. 1. The electronic device may be implemented as, for example, a notebook computer, a tablet computer, or other electronic devices of various types. It is hereinafter assumed that the electronic device is implemented as a notebook computer 10 (hereinafter referred to as computer 10).

FIG. 1 is a perspective view showing the computer 10 having a display unit opened as seen from a front surface side.

The computer 10 is configured to receive electric power from a battery 20. The computer 10 includes a computer body 11 and a display unit 12. A display device composed of a liquid crystal display (LCD) 31 is incorporated in the display unit 12. Furthermore, a camera (web camera) 32 is arranged at an upper end portion of the display unit 12.

The display unit 12 is attached to the computer body 11 so as to be rotatable between an opened position at which a top surface of the computer body 11 is exposed and a closed position at which the top surface of the computer body 11 is covered with the display unit 12. The computer body 11 has a housing shaped in a thin box and, a keyboard 13, a touchpad 14, a fingerprint sensor 15, a power button 16 which powers on and off the computer 10, several function buttons 17, and speakers 18A and 18B are arranged on the top surface of the computer body 11.

In addition, a power connector 21 is provided on the computer body 11. The power connector 21 is provided on the side surface, for example, the left side surface, of the computer body 11. An external power supply is detachably connected to the power connector 21. As the external power supply, an AC adapter may be used. The AC adapter is a power supply which converts a commercial power (AC power) into a DC power.

The battery 20 is, for example, detachably mounted on a rear end portion of the computer body 11. The battery 20 may be a battery built in the computer 10.

The computer 10 is driven by the power from the external power supply or the power from the battery 20. If the external power supply is connected to the power connector 21 of the computer 10, the computer 10 is driven by the power from the external power supply. In addition, the power from the external power supply is also used to charge the battery 20. The computer 10 is driven by the power from the battery 20 in a period in which the external power supply is not connected to the power connector 21 of the computer 10.

Furthermore, several USB ports 22, a high-definition multimedia interface (HDMI) (trademark) output terminal 23, and an RGB port 24 are provided on the computer body 11.

FIG. 2 shows a system configuration of the computer 10. The computer 10 includes a CPU 111, a system controller 112, a main memory 113, a graphic processing unit (GPU) 114, a sound codec 115, a BIOS-ROM 116, a hard disk drive (HDD) 117, an optical disk drive (ODD) 118, a Bluetooth (BT [trademark]) module 120, a wireless LAN module 121, an SD card controller 122, a PCI EXPRESS card controller 123, an embedded controller/keyboard controller IC (EC/KBC) 130, a keyboard backlight 13A, a panel open/close switch 131, an acceleration sensor 132, a power supply controller (PSC) 141, a power supply circuit 142, etc.

The CPU 111 is a processor which controls operations of the components in the computer 10. The CPU 111 executes various types of software loaded from the HDD 117 on the main memory 113. The software includes an operating system (OS) 201 and various application programs.

In addition, the CPU 111 also executes a Basic Input/Output System (BIOS) stored in the BIOS-ROM 116 which is a nonvolatile memory. The BIOS is a system program for hardware control.

The GPU 114 is a display controller which controls the LCD 31 employed as a display monitor of the computer 10. The GPU 114 generates a display signal (LVDS signal) which should be supplied to the LCD 31 from display data stored in a video memory (VRAM) 114A. Furthermore, the GPU 114 can also generate an analog RGB signal and an HDMI video signal from the display data. The analog RGB signal is supplied to an external display via the RGB port 24. The HDMI output terminal 23 can transmit the HDMI video signal (uncompressed digital video signal) and a digital audio signal to the external display via a cable. An HDMI control circuit 119 is an interface which transmits the HDMI video signal and the digital audio signal to the external display via the HDMI output terminal 23.

The system controller 112 is a bridge device which makes connection between the CPU 111 and each of the components. A serial ATA controller which controls the hard disk drive (HDD) 117 and the optical disk drive (ODD) 118 is built in the system controller 112. Furthermore, the system controller 112 executes communication with each of the devices on a low PIN count (LPC) bus.

The EC/KBC 130 is connected to the LPC bus. The EC/KBC 130, the power supply controller (PSC) 141 and the battery 20 are interconnected via a serial bus such as an I²C bus.

The EC/KBC 130 is a power management controller which executes power management of the computer 10 and is implemented as, for example, a one-chip microcomputer incorporating a keyboard controller which controls the keyboard (KB) 13, the touchpad 14, etc. The EC/KBC 130 has a function of powering on and off the computer 10 in response to the user operation of the power button 16. Control of powering on and off the computer 10 is executed by a cooperation of the EC/KBC 130 and the power supply controller (PSC) 141. When the power supply controller (PSC) 141 receives an ON signal transmitted from the EC/KBC 130, the power supply controller (PSC) 141 controls the power supply circuit 142 to power on the computer 10. In addition, when the power supply controller (PSC) 141 receives an OFF signal transmitted from the EC/KBC 130, the power supply controller (PSC) 141 controls the power supply circuit 142 to power off the computer 10. The EC/KBC 130, the power supply controller (PSC) 141, and the power supply circuit 142 execute operations with the power from the battery 20 or the AC adapter 150 even in a period in which the computer 10 is powered off.

Furthermore, the EC/KBC 130 can turn on and off the keyboard backlight 13A arranged on the back surface of the keyboard 13. Moreover, the EC/KBC 130 is connected to the panel open/close switch 131 configured to detect the opening and closing of the display unit 12. The EC/KBC 130 can also power on the computer 10 when the opening of the display unit 12 is detected by the panel open/close switch 131.

The power supply circuit 142 generates the power (operation power) which should be supplied to each of the components, with the power from the battery 20 or the power from the AC adapter 150 connected to the computer body 11 as the external power supply. The system power generated by the power supply circuit 142 may be arbitrarily supplied to a USB device connected to the computer 10 via the USB port 22.

Next, a direct-current (DC) output switching circuit incorporated in the electronic device of one of the embodiments will be explained with reference to FIG. 3. FIG. 3 is a circuit diagram showing a circuit configuration example of the DC output switching circuit of one of the embodiments. A DC output switching circuit 300 is a circuit incorporated in a power supply circuit 142, and is a circuit capable of changing (switching) the voltage supplied to the USB device connected via the USE port 22 in accordance with a system status of the computer 10. More specifically, when the system status of the computer 10 is in a power-saving status, the DC output switching circuit 300 can vary the voltage value generated by (a DC-DC converter incorporated in) the power supply circuit 142, from a voltage value suitable to each of the components of the computer 10 to a voltage value suitable to the USB device connected via the USB port 22. The voltage value suitable to the USB device is a voltage value, for example, 5 V (including a permissible width of ±0.25 V) defined by the USB-IF.

The system status of the computer 10 will be explained simply.

In general, the system status of the computer 10 is roughly divided into six statuses S0 to S5. Status S0 indicates a general operation status. Status S1 indicates a power-saving mode (with the processor and the chip set both powered on). Status S2 indicates a power-saving mode (with the processor powered off and the chip set powered on). Status S3 indicates a standby status. Status S4 indicates a pause status. Status S5 indicates a status of powering off by the software. In the present embodiment, the power-saving status is assumed to be any one of statuses S3 to S5.

The DC output switching circuit 300 shown in FIG. 3 includes a plurality of reference circuits 301 and 302, a DC-DC converter 303, and a smoothing circuit 304. Each of the reference circuits 301 and 302 is a circuit which generates a reference voltage output to the DC-DC converter 303.

The reference circuit 301 includes a device detection/current control IC 301A, a MOS-FET 301B, and a resistor R1 and a resistor R3. The device detection/current control IC 301A can be implemented by an exclusive IC, but the EC/KBC 130 can play this role, controlling the reference circuit 301 so as to produce a reference voltage $V_{ref1}$ (for example, a voltage suitable to be supplied to each of the components of the computer 10) which is output to the DC-DC converter 303 in response to a trigger from the EC/KBC 130. More specifically, the device detection/current control IC 301A turns on the MOS-FET 301B in response to the trigger from the EC/KBC 130. By turning on the MOS-FET 301B, the reference voltage $V_{ref1}$ corresponding to the values of the resistors R1 and R3 is generated and output to the DC-DC converter 303. The concrete values of the reference voltage $V_{ref1}$, the resistor R1, and the resistor R3 are set to meet the equation (1).

$$V_{ref1} = 2 \times (R3/R1 + 1) \tag{1}$$

Similarly to the reference circuit 301, the reference circuit 302 includes a device detection/current control IC 302A, a MOS-FET 302B, and a resistor R2 and the resistor R3 as shown in FIG. 3. The device detection/current control IC 302A is a module connected with the EC/KBC 130, and controls a reference circuit 302 so as to generate a reference voltage $V_{ref2}$ (for example, a voltage suitable to be supplied to the USB device connected via the USB port 22) which is output to the DC-DC converter 303 in response to a trigger from the EC/KBC 130. More specifically, the device detection/current control IC 302A turns on the MOS-FET 302B in response to the trigger from the EC/KBC 130. By turning on the MOS-FET 302B, the reference voltage $V_{ref2}$ corresponding to the values of the resistors R2 and R3 is generated and output to the DC-DC converter 303. Concrete values of the reference voltage $V_{ref2}$, the resistor R2, and the resistor R3 are set to meet the equation (2).

$$V_{ref2}=2\times(R3/R2+1) \qquad (2)$$

The DC-DC converter 303 generates the voltage of a predetermined value (i.e., a voltage having the same value as the reference voltage input to the DC-DC converter 303), and outputs the voltage to the USB device connected to the computer 10 via the USB port 22, by turning on and off the MOS-FET shown in FIG. 3. Since a waveform (output waveform) of the voltage generated by the DC-DC converter 303 is a triangle wave and is in an unstable state, the voltage is smoothed by the smoothing circuit 304 and output to the USB device in a state in which a voltage ripple is suppressed. By thus processing the voltage via the smoothing circuit 304, voltage supply can be executed so as not to violate input voltage specifications of the USB device connected to the computer 10 via the USB port 22. In the present embodiment, the smoothing circuit 304 is composed of an inductor L, a resistor R4, and capacitors C1 and C2 as shown in FIG. 3, but the configuration of the smoothing circuit 304 may be arbitrarily switched (for example, to an LC circuit composed of an inductor and a capacitor, etc.)

A MOS-FET 306 connected to the DC-DC converter 303 is a MOS-FET provided to extract electric charges quickly.

Next, an example of operations of the DC output switching circuit 300 will be explained with reference to a flowchart of FIG. 4. In the following explanations, the voltage suitable to each of the components of the computer 10 is represented by $V_{ref1}$ while the voltage suitable to be supplied to the USB device connected to the computer 10 via the USB port 22 is represented by $V_{ref2}$.

When the computer 10 is activated (booted) (in other words, when the system status of the computer is status S0), if the USB device is connected to the computer 10 via the USB port 22, the device detection/current control IC 301A in the reference circuit 301 turns on the MOS-FET 301B to output the reference voltage $V_{ref1}$ to the DC-DC converter 303, in accordance with the trigger from the EC/KBC 130. The DC-DC converter 303 generates the voltage $V_{ref1}$ based on the reference voltage Vref1, and outputs the voltage to the USB device (blocks 1001 and 1002).

After that, if the computer 10 shifts to a shut-down status or a sleep status (in other words, if the system status of the computer 10 is in any one of statuses S3 to S5), the DC output switching circuit 300 confirms whether the user has preliminarily made the setting that the output voltage may be switched in accordance with the system status of the computer 10 (blocks 1003 and 1004).

If the user has not made the setting that the output voltage may be switched in accordance with the system status of the computer 10 (No in block 1004), the EC/KBC 130 instructs the reference circuit 301 to generate the reference voltage. In response to the request from the EC/KBC 130, the device detection/current control IC 301A in the reference circuit 301 remains the MOS-FET 301B turned on and outputs the reference voltage $V_{ref1}$ to the DC-DC converter 303. The DC-DC converter 303 generates the voltage $V_{ref1}$ based on the reference voltage $V_{ref1}$, and outputs the voltage to the USB device. In other words, the processing of block 1002 is executed again.

In contrast, if the user has made the setting that the output voltage may be switched in accordance with the system status of the computer 10 (Yes in block 1004), the EC/KBC 130 instructs the reference circuit 301 to generate the reference voltage. In response to the request from the EC/KBC 130, the device detection/current control IC 302A in the reference circuit 302 turns on the MOS-FET 302B and outputs the reference voltage $V_{ref2}$ to the DC-DC converter 303. The DC-DC converter 303 generates the voltage $V_{ref2}$ based on the reference voltage $V_{ref2}$, and outputs the voltage to the USB device (block 1005).

After that, if the computer 10 is resumed or booted (in other words, if the system status of the computer 10 returns to status S0), the EC/KBC 130 instructs the reference circuit 301 again to generate the reference voltage. In response to the request from the EC/KBC 130, the device detection/current control IC 301A in the reference circuit 301 turns on the MOS-FET 301B and outputs the reference voltage $V_{ref1}$ to the DC-DC converter 303. The DC-DC converter 303 generates the voltage $V_{ref1}$ based on the reference voltage Vref1, and continues outputting the voltage $V_{ref1}$ to the USB device until the computer 10 shifts again to the shutdown status or the sleep status (blocks 1006 and 1007). If the computer 10 shifts again to the shutdown status or the sleep status, the processing of block 1003 is executed again.

Two reference circuits 301 and 302 are incorporated in the DC output switching circuit 300, in the present embodiment, but the number of reference circuits provided in the DC output switching circuit 300 is not limited to this. For example, besides the reference circuit 301 which outputs the reference voltage $V_{ref1}$ suitable to each of the components of the computer 10 and the reference circuit 302 which outputs the reference voltage $V_{ref2}$ (voltage higher than the reference voltage $V_{ref1}$) suitable to the USB device connected via the USB port 22, a reference circuit capable of outputting a reference voltage $V_{ref3}$ of a predetermined value (for example, a voltage lower than the reference voltage $V_{ref1}$) may be further provided.

In addition, the EC/KBC 130 is connected to two reference circuits 301 and 302 with two signal lines, as the configuration of the DC output switching circuit 300, in the present embodiment, but the DC output switching circuit 300 may have a configuration shown in, for example, FIG. 5 to reduce the number of the signal lines to connect the EC/KBC 130 with the reference circuits. In this case, the reference circuits are switched by not the MOS-FET, but an analog switch IC 312 as shown in FIG. 5. Thus, the number of the signal lines to connect the EC/KBC 130 with the reference circuits can be reduced, and the device detection/current control IC connected with the EC/KBC 130 can be used commonly by two reference circuits. In other words, the configuration of the DC output switching circuit 300 can be simplified.

Furthermore, the external device which supplies the power is the USB device in the present embodiment, but is not limited to the USB device alone. In other words, the computer 10 can also output a suitable voltage to an external device (for example, an HDMI device) other than a USB device including a terminal (for example, an HDMI terminal, etc.) having power supply pins.

In addition, the EC/KBC 130 instructs two reference circuits 301 and 302 to generate the reference voltages, in the present embodiment, but any device such as what is called a microcomputer (for example, a CPU, etc.) may output instructions to the reference circuits.

According to the above-explained embodiment, the computer 10 has a configuration capable of switching the voltage supplied to the external device connected to the computer 10, from the voltage suitable to be supplied to each of the components of the computer 10 to the voltage suitable to be supplied to the external device, in accordance with the system status of the computer 10. In other words, a plurality of charging systems can be supported.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device, comprising:
a port configured to connect with an external device; and
a power supply control circuit comprising a first reference circuit and a second reference circuit, the first reference circuit capable of generating a first voltage suitable for a plurality of components in the electronic device, the second reference circuit capable of generating a second voltage suitable for the external device, the second voltage being different from the first voltage, wherein
the power supply control circuit is configured to supply the first voltage generated by the first reference circuit to the external device connected with the port if a state of the electronic device is a general operation state, and to supply the second voltage generated by the second reference circuit to the external device connected with the port if the state of the electronic device is a shutdown state or a sleep state, and
the second voltage is higher than the first voltage.

2. The electronic device of claim 1, wherein
the first voltage generated by the first reference circuit and the second voltage generated by the second reference circuit are supplied to the external device via a smoothing circuit configured to suppress a voltage ripple.

3. The electronic device of claim 1, wherein
switching control of the first reference circuit and the second reference circuit is executed by an instruction from a keyboard controller configured to perform power management.

4. The electronic device of claim 1, wherein
the power supply control circuit switches from the first voltage generated from the first reference circuit to the second voltage generated from the second reference circuit if the state of the electronic device is the shutdown state or the sleep state and if a user preliminarily executes a setting that the voltage supplied to the external device may be switched.

5. A method applicable to an electronic device comprising a port configured to connect with an external device, and a power supply control circuit comprising a first reference circuit and a second reference circuit, the first reference circuit capable of generating a first voltage suitable for a plurality of components in the electronic device, the second reference circuit capable of generating a second voltage suitable for the external device, the second voltage being different from the first voltage, the method comprising:
supplying the first voltage generated by the first reference circuit to the external device connected with the port if a state of the electronic device is a general operation state, and supplying the second voltage generated by the second reference circuit to the external device connected with the port if the state of the electronic device is a shutdown state or a sleep state, wherein
the second voltage is higher than the first voltage.

6. The method of claim 5, wherein
the first voltage generated by the first reference circuit and the second voltage generated by the second reference circuit are supplied to the external device via a smoothing circuit configured to suppress a voltage ripple.

7. The method of claim 5, further comprising
executing switching control of the first reference circuit and the second reference circuit by an instruction from a keyboard controller configured to perform power management.

8. The method of claim 5, further comprising
switching from the first voltage generated from the first reference circuit to the second voltage generated from the second reference circuit if the state of the electronic device is the shutdown state or the sleep state and if a user preliminarily executes a setting that the voltage supplied to the external device may be switched.

9. An electronic device, comprising:
a port connectable to an external device;
a power supply configured to generate a voltage, the generated voltage supplied to the external device through the port and internal components of the electronic device; and
a power supply controller configured to
change a level of the voltage generated from the power supply from a first level to a second level when the electronic device is a shutdown state or a sleep state, and
change a level of the voltage generated from the power supply from the second level to the first level when the electronic device is not the shutdown state or the sleep state, wherein
the second level is higher than the first level.

10. The electronic device of claim 9, further comprising a user setting device configured to set a voltage change mode by a user operation, and
wherein the power supply controller is further configured to change a level of the voltage generated from the power supply from the first level to the second level when the electronic device is the shutdown state or the sleep state and the voltage change mode is set.

* * * * *